(12) United States Patent
Ito et al.

(10) Patent No.: US 9,738,483 B2
(45) Date of Patent: Aug. 22, 2017

(54) TAPE STICKING APPARATUS AND TAPE STICKING METHOD

(71) Applicants: Ebara Corporation, Tokyo (JP); IS ENGINEERING CO., LTD., Niigata (JP)

(72) Inventors: Kenya Ito, Tokyo (JP); Keisuke Uchiyama, Tokyo (JP); Tomiichi Matsui, Niigata (JP); Mahito Shibuya, Niigata (JP)

(73) Assignees: Ebara Corporation, Tokyo (JP); IS ENGINEERING CO., LTD., Niigata (JP)

( * ) Notice: Subject to any disclaimer, the term of this patent is extended or adjusted under 35 U.S.C. 154(b) by 95 days.

(21) Appl. No.: 14/720,068

(22) Filed: May 22, 2015

(65) Prior Publication Data

US 2016/0023861 A1 Jan. 28, 2016

(30) Foreign Application Priority Data

May 28, 2014 (JP) ................................ 2014-110515

(51) Int. Cl.
*C09J 5/00* (2006.01)
*B65H 37/06* (2006.01)
*B65H 35/00* (2006.01)

(52) U.S. Cl.
CPC ......... *B65H 37/06* (2013.01); *B65H 35/0013* (2013.01); *C09J 5/00* (2013.01); *B65H 2701/11112* (2013.01)

(58) Field of Classification Search
USPC ......................................... 156/247
See application file for complete search history.

(56) References Cited

U.S. PATENT DOCUMENTS

| 4,401,503 A | * | 8/1983 | Hertel | B31F 5/085 |
| | | | | 156/201 |
| 4,588,463 A | * | 5/1986 | Barber | B31F 1/0029 |
| | | | | 156/200 |
| 7,798,195 B2 | * | 9/2010 | Kobayashi | H01L 21/67132 |
| | | | | 156/65 |

FOREIGN PATENT DOCUMENTS

| DE | 202011104929 U1 | * | 1/2012 |
| JP | 2005-303158 | | 10/2005 |
| JP | 2005-317570 | | 11/2005 |
| JP | 2006-186151 A | * | 7/2006 |
| JP | 2006-352078 A | * | 12/2006 |
| WO | WO-2010/018767 A1 | * | 2/2010 |

OTHER PUBLICATIONS

Machine Translation of PCT WO 2010/018767 (from Japanese Priority document 201122541), date unknown.*
(Continued)

*Primary Examiner* — Jeff Aftergut
(74) *Attorney, Agent, or Firm* — Leydig, Voit & Mayer, Ltd.

(57) ABSTRACT

A tape sticking apparatus for sticking a masking tape for protecting a peripheral portion of a substrate, such as a wafer, is disclosed. The tape sticking apparatus includes: a substrate holder configured to hold and rotate a substrate; and a tape sticking unit configured to stick a masking tape onto a peripheral portion of the substrate held on the substrate holder.

16 Claims, 9 Drawing Sheets

(56) References Cited

OTHER PUBLICATIONS

Machine translation of Japanese Patent 2006-352078, date unknown.*
Machine translation of German Patent 20201104929, date unknown.*
Machine translation of Japanese Patent 2006-186151, date unknown.*

* cited by examiner

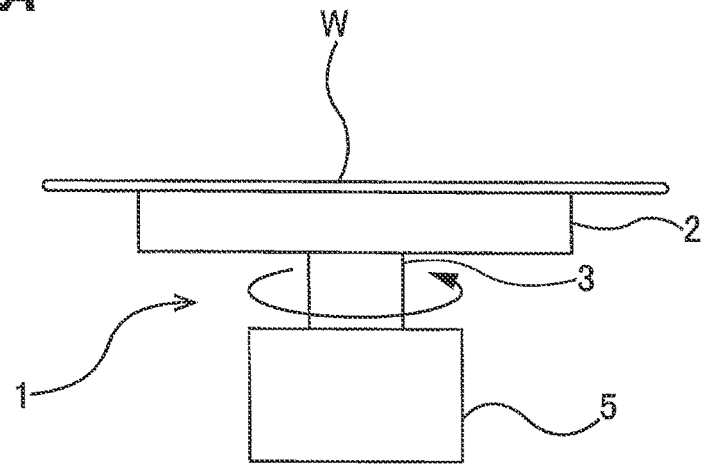
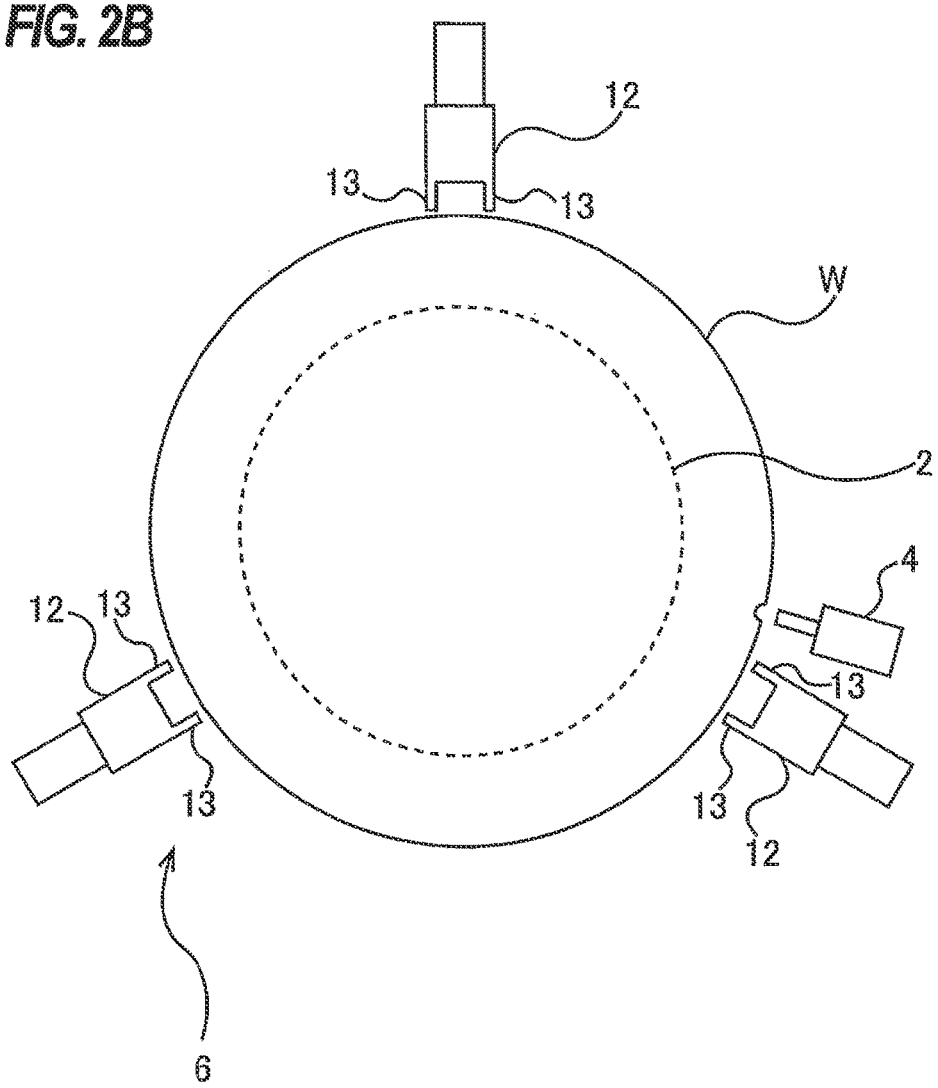

DIRECTION OF MOVEMENT OF TAPE AND WAFER

TAPE STICKING APPARATUS AND TAPE STICKING METHOD

CROSS REFERENCE TO RELATED APPLICATION

This document claims priority to Japanese Patent Application Number 2014-110515 filed May 28, 2014, the entire contents of which are hereby incorporated by reference.

BACKGROUND

In conventional practice, a protective film is attached to an entirety of a front surface of a wafer in order to protect devices formed on the surface of the wafer (see Japanese patent laid-open publication No. 2005-303158 and Japanese patent laid-open publication No. 2005-317570). A protective film may be attached to an entirety of a back surface (i.e., a surface opposite to the front surface on which devices are formed) in order to protect the back surface from a liquid chemical (e.g., a plating solution) and polishing debris. In a plating process, for example, a wafer, having a protective film attached to the back surface thereof, is immersed in a plating solution, and in this state plating of the wafer is performed.

However, the protective film can sometimes peel off the wafer during processing of the wafer. For example, since the plating solution is heated to a certain processing temperature, an adhesive power of an adhesive of the protective film is lowered, and as a result a peripheral portion of the protective film may peel off the wafer. Once the peripheral portion of the protective film has peeled off, the plating solution will intrude into a gap between the back surface of the wafer and the protective film. As a result, metal ions contained in the plating solution may adhere to the wafer back surface composed of silicon and may diffuse into the wafer, resulting in performance failure of devices.

These days, there is a demand for protecting not only front and back surfaces of a wafer but also a peripheral portion of the wafer. For example, in a process of forming trenches in a wafer by dry etching, a plasma is generated on the surface of the wafer in the presence of an etching gas, and trenches are formed at desired positions in the wafer using a resist as a mask. In this dry etching process, pillar structures of silicon, called "black silicon", may be formed on a peripheral portion of the wafer where no resist exists. Such black silicon may fall off the peripheral portion of the wafer e.g., when the peripheral portion is gripped by a transport machine. The fallen black silicon may adhere to devices formed on the wafer, causing a defect, such as short circuit, in the devices.

SUMMARY OF THE INVENTION

According to one embodiment, there is provided a tape sticking apparatus for sticking a masking tape for protecting a peripheral portion of a substrate, such as a wafer. There is also provided a tape sticking method of sticking the masking tape on the peripheral portion of the substrate.

The below-described embodiments relate to a tape sticking apparatus and a tape sticking method for sticking a masking tape for protecting a peripheral portion of a substrate, such as a wafer.

In an embodiment, there is provided a tape sticking apparatus comprising: a substrate holder configured to hold and rotate a substrate; and a tape sticking unit configured to stick a masking tape onto a peripheral portion of the substrate held on the substrate holder.

In an embodiment, the tape sticking unit includes: a side roller configured to press the masking tape against a peripheral side surface of the substrate; a first roller configured to bend the masking tape, which has been pressed against the peripheral side surface of the substrate, along a longitudinal direction of the masking tape and stick a bent portion of the masking tape onto an upper surface of the peripheral portion of the substrate; and a second roller configured to bend the masking tape, which has been pressed against the peripheral side surface of the substrate, along the longitudinal direction of the masking tape and stick a bent portion of the masking tape onto a lower surface of the peripheral portion of the substrate.

In an embodiment, the tape sticking unit further includes a tape holding head configured to hold a beginning of the masking tape and stick the beginning onto the peripheral side surface of the substrate.

In an embodiment, the tape sticking unit further includes a positioning member configured to perform positioning of the masking tape in a direction perpendicular to a surface of the substrate.

In an embodiment, the tape sticking unit further includes a tape cutter configured to cut the masking tape with its end projecting from the peripheral portion of the substrate.

In an embodiment, the tape sticking apparatus further comprises a tape peeling unit configured to peel the masking tape from the peripheral portion of the substrate.

In an embodiment, the tape peeling unit includes: a tape advancing roller configured to peel the masking tape from the substrate while advancing the masking tape at a speed which is synchronous with a rotational speed of the substrate; and a take-up roller configured to wind thereon the masking tape advanced from the tape advancing roller.

In an embodiment, there is provided a tape sticking method comprising: sticking a masking tape onto a peripheral portion of a substrate while rotating the substrate.

In an embodiment, sticking the masking tape onto the peripheral portion of the substrate comprises: pressing the masking tape against a peripheral side surface of the substrate while rotating the substrate; bending the masking tape, which has been pressed against the peripheral side surface of the substrate, along a longitudinal direction of the masking tape and sticking a bent portion of the masking tape onto an upper surface of the peripheral portion of the substrate while rotating the substrate; and bending the masking tape, which has been pressed against the peripheral side surface of the substrate, along the longitudinal direction of the masking tape and sticking a bent portion of the masking tape onto a lower surface of the peripheral portion of the substrate while rotating the substrate.

In an embodiment, the tape sticking method further comprises holding a beginning of the masking tape and sticking the beginning onto the peripheral side surface of the substrate before rotating the substrate.

In an embodiment, the tape sticking method further comprises, before pressing the masking tape against the peripheral side surface of the substrate, performing positioning of the masking tape in a direction perpendicular to a surface of the substrate.

In an embodiment, the tape sticking method further comprises cutting the masking tape with its end projecting from the peripheral portion of the substrate.

In an embodiment, a width of the bent portion of the masking tape stuck on the upper surface of the peripheral portion of the substrate is different from a width of the bent portion of the masking tape stuck on the lower surface of the peripheral portion of the substrate.

In an embodiment, a width of the bent portion of the masking tape stuck on the upper surface of the peripheral portion of the substrate is larger than a width of the bent portion of the masking tape stuck on the lower surface of the peripheral portion of the substrate.

In an embodiment, the tape sticking method further comprises peeling the masking tape from the peripheral portion of the substrate while rotating the substrate.

In an embodiment, peeling the masking tape from the peripheral portion of the substrate comprises: peeling the masking tape from the substrate while advancing the masking tape at a speed which is synchronous with a rotational speed of the substrate; and winding the masking tape which has been advanced at the speed which is synchronous with the rotational speed of the substrate.

According to the above-described embodiments, the masking tape is stuck on the peripheral portion of the substrate by the tape sticking unit to protect the peripheral portion of the substrate. Consequently, for example, a peripheral portion of a protective film attached to the entire back surface of the substrate is covered with the masking tape. Therefore, the peripheral portion of the protective film will not peel off even when the substrate is immersed in a processing liquid, such as a plating solution. This can prevent contact of the processing liquid with the back surface of the substrate. Further, when the substrate with the masking tape attached to the peripheral portion of the substrate is subjected to dry etching, no black silicon is produced on the peripheral portion of the substrate. This can prevent a defect in a device formed on the surface of the substrate.

BRIEF DESCRIPTION OF THE DRAWINGS

FIG. 2A is a side view of a substrate holder of a tape sticking apparatus, and FIG. 2B is a plan view of the substrate holder of the tape sticking apparatus;

DESCRIPTION OF EMBODIMENTS

A tape sticking apparatus according to embodiments will now be described with reference to the drawings.

The tape sticking apparatus is an apparatus for sticking a masking tape onto a peripheral portion of a substrate, such as a wafer, to protect the peripheral portion of the substrate with the masking tape. A peripheral portion of a substrate is defined herein as an area including a bevel portion, located outermost in the substrate, and a top edge portion and a bottom edge portion, lying radially inside the bevel portion.

Figure 1A:
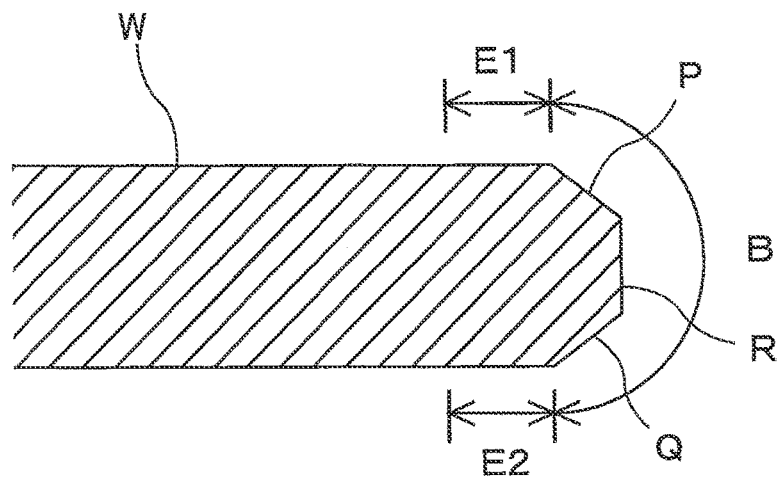
FIG. 1A and FIG. 1B are enlarged cross-sectional views each illustrating a peripheral portion of a wafer.
Figure 1B:
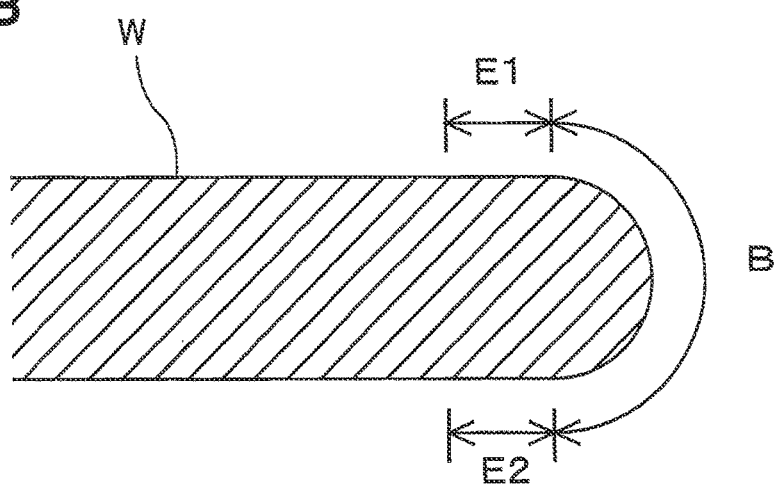

FIG. 1A and FIG. 1B are enlarged cross-sectional views each illustrating a peripheral portion of a wafer which is an example of a substrate. More specifically, FIG. 1A is a cross-sectional view of a wafer W of so-called straight type, and FIG. 1B is a cross-sectional view of a wafer W of so-called round type. In the wafer W shown in FIG. 1A, the bevel portion is an outermost portion (indicated by a symbol B) composed of an upper slope portion (upper bevel portion) P, a lower slope portion (lower bevel portion) Q, and a side portion (apex) R. In the wafer W shown in FIG. 1B, the bevel portion is an outermost portion (indicated by a symbol B) having a curved cross-section. The top edge portion is a flat portion E1 lying radially inside the bevel portion B. The bottom edge portion is a flat portion E2 located opposite to the top edge portion and lying radially inside the bevel portion B.

The bevel portion B, the top edge portion E1 and the bottom edge portion E2 are collectively referred to as a peripheral portion. The peripheral portion may include an area in which a device is formed. In the following descriptions, a peripheral side surface of a peripheral portion of a wafer W refers to a surface of the bevel portion B, an upper surface of the peripheral portion of the wafer W refers to a surface of the top edge portion E1, and a lower surface of the peripheral portion of the wafer W refers to a surface of the bottom edge portion E2.

FIG. 2A and FIG. 2B are diagrams showing a substrate holder 1 for holding and rotating a substrate, such as a wafer. More specifically, FIG. 2A is a side view of the substrate holder 1, and FIG. 2B is a plan view of the substrate holder 1. The substrate holder 1 is incorporated in the tape sticking apparatus. As shown in FIG. 2A, the substrate holder 1 includes a substrate stage 2 for holding a wafer W in a horizontal position, a rotating shaft 3 secured to a central portion of a lower surface of the substrate stage 2, and a stage motor 5 for rotating the rotating shaft 3 and the substrate stage 2. The substrate stage 2 is coupled to a not-shown vacuum source so that the wafer W can be held on an upper surface (or a substrate holding surface) of the substrate stage 2 by vacuum suction created by the vacuum source. When the stage motor 5 is in motion, the rotating shaft 3 rotates in a direction indicated by arrow shown in the figure, whereby the substrate stage 2 rotates together with the wafer W on the substrate stage 2.

As shown in FIG. 2B, the substrate holder 1 has a centering mechanism 6 for centering the wafer W before holding the wafer W on the substrate stage 2 by the vacuum suction. The centering mechanism 6 includes a plurality of (e.g., three as illustrated) centering fingers 12 arranged at equal intervals along a circumferential direction of the wafer W. Each centering finger 12 has, at its front end, two projecting portions (finger portions) 13 capable of touching the peripheral portion of the wafer W. Each centering finger 12 is configured to be capable of moving toward the center of the wafer W and away from the wafer W by a not-shown moving device (e.g., air cylinder). When each centering finger 12 moves toward the center of the wafer W, the projecting portions 13 come into contact with the peripheral portion of the wafer W, thereby pressing the wafer W toward its center. The three centering fingers 12 are simultaneously moved toward the center of the wafer W, until the peripheral portion of the wafer W is pressed from three directions simultaneously toward the center of the wafer W. The centering of the wafer W is effected in this manner. Upon completion of the centering of the wafer W, the center of the rotating shaft 3 is aligned with the center of the wafer W.

The substrate holder 1 includes a notch detector 4 which can detect a notch of the wafer W. By detecting the notch of the wafer W with the notch detector 4, a reference for a rotational position of the wafer W can be determined. This makes it possible to start or terminate sticking of the below-described masking tape on the wafer at a desired position on the wafer.

Figure 3:
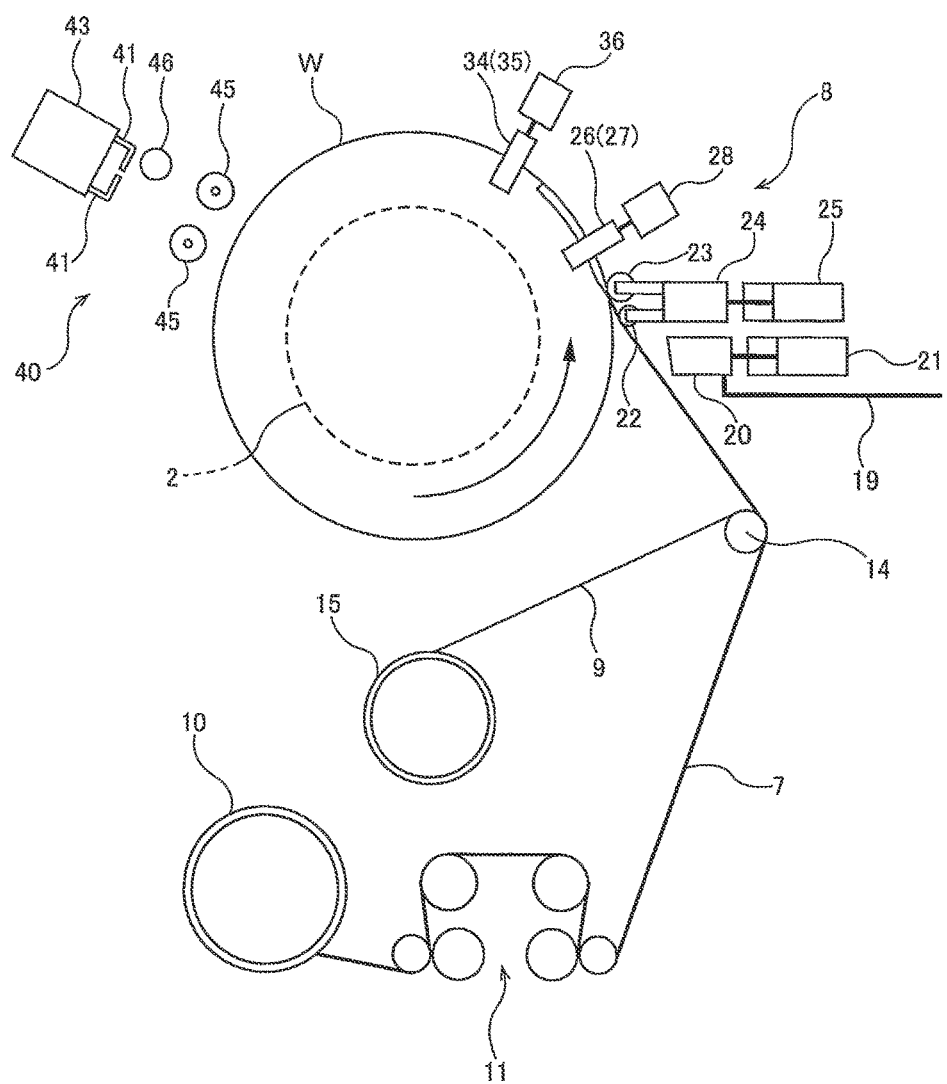
FIG. 3 is a plan view showing an embodiment of the tape sticking apparatus.

FIG. 3 is a plan view showing an embodiment of a tape sticking apparatus. The tape sticking apparatus includes the substrate holder 1 shown in FIG. 2A and FIG. 2B, and a tape sticking unit 8 for sticking a masking tape onto the peripheral portion of the rotating wafer W held on the substrate holder 1. As shown in FIG. 3, the substrate W, held on the stage 2, is rotated M a direction indicated by arrow shown in FIG. 3, while a masking tape 7 is stuck on the wafer W by the tape sticking unit 8.

The masking tape 7 to be supplied to the tape sticking unit 8 is held on a feeding roller 10. The masking tape 7, fed from the feeding roller 10, passes through a tension unit 11 having a plurality of rollers, where a desired tension is applied to the masking tape 7. The masking tape 7 that has passed through the tension unit 11 is supplied via a guide roller 14 to the tape sticking unit 8. A separation film 9, which is attached to an adhesive surface of the masking tape 7, is peeled off from the masking tape 7 when the masking tape 7 passes the guide roller 14, and is wound around a film take-up roller 15.

The masking tape 7 comprises a flexible base tape, and an adhesive layer formed on one surface of the base tape. A synthetic resin, such as polyolefin (PO), polyethylene (PE) or polyimide, can be used as a material of the base tape. A thickness of the masking tape 7 is, for example, 60 μm to 80 μm.

The tape sticking unit 8 includes a tape holding head 20 for holding a beginning of the masking tape 7 and sticking the beginning onto the peripheral side surface (see the symbol B in FIGS. 1A and 1B) of the wafer W, a positioning roller 22 as a positioning member for performing positioning of the masking tape 7 in a direction perpendicular to the surface of the wafer W, and a side roller 23 for pressing the masking tape 7 against the peripheral side surface of the wafer W.

The tape sticking unit 8 further includes a first roller 26 for bending the masking tape 7, which has been pressed against the peripheral side surface of the wafer W, along a longitudinal direction of the masking tape 7 and sticking a bent portion of the masking tape 7 onto the upper surface of the peripheral portion (see the symbol E1 in FIGS. 1A and 1B) of the wafer W, and a second roller 27 for bending the masking tape 7, which has been pressed against the peripheral side surface of the wafer W, along the longitudinal direction of the masking tape 7 and sticking a bent portion of the masking tape 7 onto the lower surface of the peripheral portion (see the symbol E2 in FIGS. 1A and 1B) of the wafer W.

The first roller 26 is disposed above the second roller 27, and the peripheral portion of the wafer W is located between the first roller 26 and the second roller 27. Since the second roller 27 is located below the first roller 26, only the first roller 26 is shown in FIG. 3. The second roller 27 is shown in FIGS. 5A through 5C and FIG. 6.

The tape holding head 20 is coupled to an electric cylinder 21 as a head actuator so that the tape holding head 20 can move by the electric cylinder 21 in directions closer to and away from the peripheral portion of the wafer W. The tape holding head 20 is configured to be capable of detachably holding the beginning of the masking tape 7. More specifically, the tape holding head 20 is coupled to a vacuum line 19 so that the tape holding head 20 can hold the beginning of the masking tape 7 by vacuum suction generated by the vacuum line 19.

Figure 4A:
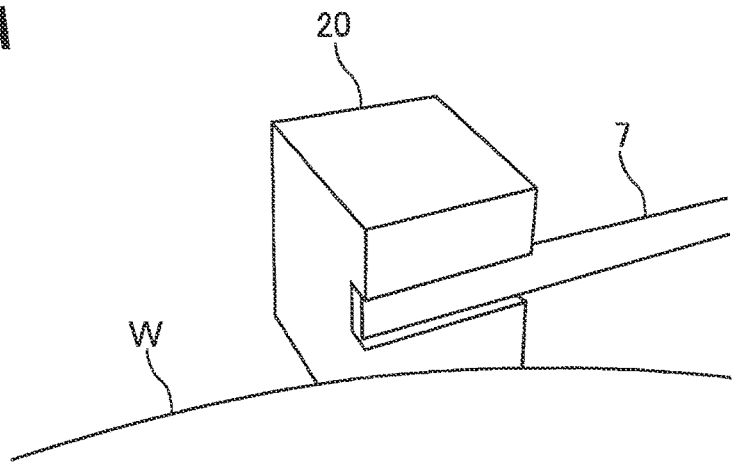
FIG. 4A, FIG. 4B, and FIG. 4C are perspective views illustrating a process of sticking a beginning of a masking tape onto a peripheral side surface of a wafer by a tape holding head.
Figure 4B:
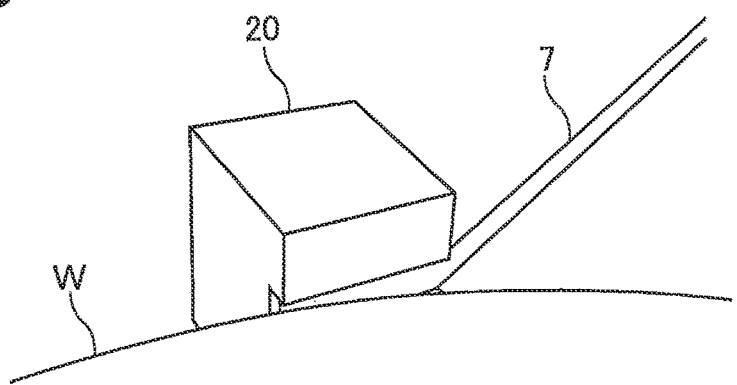
Figure 4C:
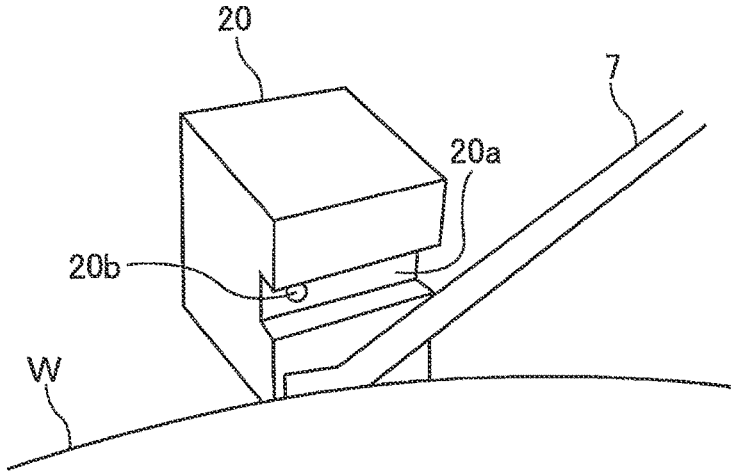

FIGS. 4A through 4C are perspective views illustrating a process of sticking the beginning of the masking tape 7 onto the peripheral side surface of the wafer W by the tape holding head 20. A tape holding groove 20a, extending parallel to the surface of the wafer W, is formed in a front face of the tape holding head 20. A vacuum suction opening 20b, which enables the tape holding head 20 to detachably hold the beginning of the masking tape 7, is formed in a bottom of the tape holding groove 20a. The vacuum suction opening 20b communicates with the above-described vacuum line 19.

The tape holding head 20 operates as follows. As shown in FIG. 4A, the beginning of the masking tape 7 is held on the tape holding head 20 by the vacuum suction. Next, as shown in FIG. 4B, the electric cylinder 21 is actuated to move the tape holding head 20 toward the peripheral side surface of the wafer W until the beginning of the masking tape 7 comes into contact with the peripheral side surface of the wafer W. Next, the vacuum suction by the vacuum line 19 is shut off and the tape holding head 20 is moved away from the peripheral portion of the wafer W. By operating the tape holding head 20 in this manner, the beginning of the masking tape 7 is stuck on the peripheral side surface of the wafer W as shown in FIG. 4C.

As shown in FIG. 3, the positioning roller 22 and the side roller 23 are rotatably secured to a common support 24. The axes of the positioning roller 22 and the side roller 23 extend in a direction perpendicular to the surface of the wafer W (i.e., in the vertical direction). The support 24 is coupled to an air cylinder 25 as a roller actuator.

When the air cylinder 25 is in motion, the positioning roller 22 and the side roller 23 simultaneously move toward the peripheral side surface of the wafer W. The direction of the movement of the positioning roller 22 and the side roller 23 is parallel to the surface of the wafer W. The positioning roller 22 and the side roller 23 are arranged at different positions in the movement direction. Therefore, as shown in FIG. 3, while the side roller 23 presses the masking tape 7 against the peripheral side surface of the wafer W, the positioning roller 22 only touches the back surface (i.e., the surface opposite to the adhesive surface) of the masking tape 7 and dose not press the masking tape 7 against the peripheral side surface of the wafer W. The positioning roller 22 and the side roller 23 may be coupled to different air cylinders.

The first roller 26 and the second roller 27 are configured to be rotatable about their own axes. The axes of the first roller 26 and the second roller 27 extend parallel to the surface of the wafer W and extend in the radial direction of the wafer W. The first roller 26 and the second roller 27 are coupled to a moving device 28 which may be comprised of an air cylinder. When the moving device 28 is in motion, the first roller 26 and the second roller 27 move in directions closer to and away from each other (i.e., in directions closer to and away from the peripheral portion of the wafer W).

The directions of the movements of the first roller 26 and the second roller 27 are perpendicular to the surface of the wafer W.

With the above-described construction, the first roller 26 and the second roller 27 can bend the masking tape 7 along its longitudinal direction and stick the bent portions onto the upper surface and the lower surface of the peripheral portion of the wafer W. In this embodiment the first roller 26 and the second roller 27 are disposed at positions as to sandwich the peripheral portion of the wafer W. While the first roller 26 and the second roller 27 may be disposed at different positions along the circumferential direction of the wafer W.

The positioning roller 22, the side roller 23, the first roller 26, and the second roller 27, which are configured to be rotatable, are not coupled to rotating devices, such as motors. Thus, these rollers 22, 23, 26, 27 are rotated by the contact with the masking tape 7 which is moving along with the rotation of the wafer W.

Figure 5A:
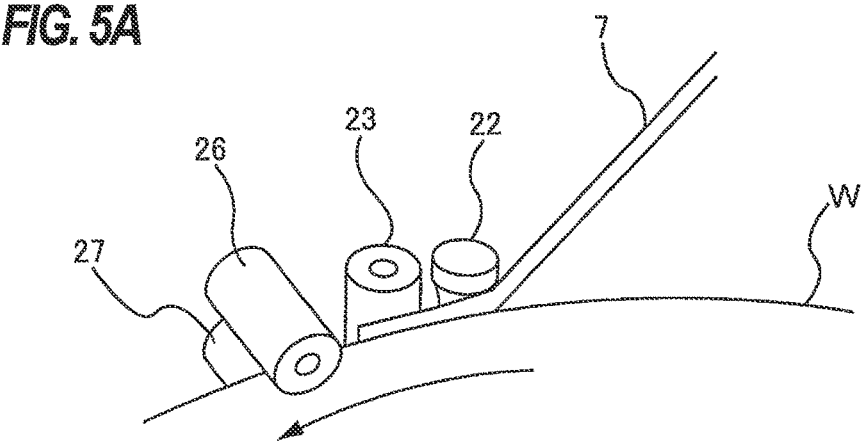
FIG. 5A, FIG. 5B, and FIG. 5C are perspective views each illustrating a manner in which the masking tape is stuck on a peripheral portion of the wafer.

The operation of the tape sticking unit 8 will now be described. First, as shown in FIGS. 4A through 4C, the beginning of the masking tape 7 is stuck on the peripheral side surface of the wafer W by the tape holding head 20. Next, the positioning roller 22 and the side roller 23 are moved toward the wafer W until the side roller 23 comes into contact with the peripheral side surface of the wafer W. The wafer W, with the beginning of the masking tape 7 stuck on the peripheral side surface, is rotated about its axis by the stage motor 5. As shown in FIG. 5A, the positioning roller 22 is disposed upstream of the side roller 23 with respect to the direction of the movement of the masking tape 7. Accordingly, the masking tape 7 is guided first by the positioning roller 22 and then guided by the side roller 23.

The vertical position of the masking tape 7 is fixed by the positioning roller 22. In particular, the positioning roller 22 has a drum-like shape with a narrow middle portion. The masking tape 7 is guided by this narrow portion, so that positioning of the masking tape 7 in the vertical direction is achieved. The masking tape 7 which has passed the positioning roller 22 is pressed with a predetermined force by the side roller 23 against the peripheral side surface of the wafer W, whereby the masking tape 7 is stuck on the peripheral side surface of the wafer W.

Figure 5B:
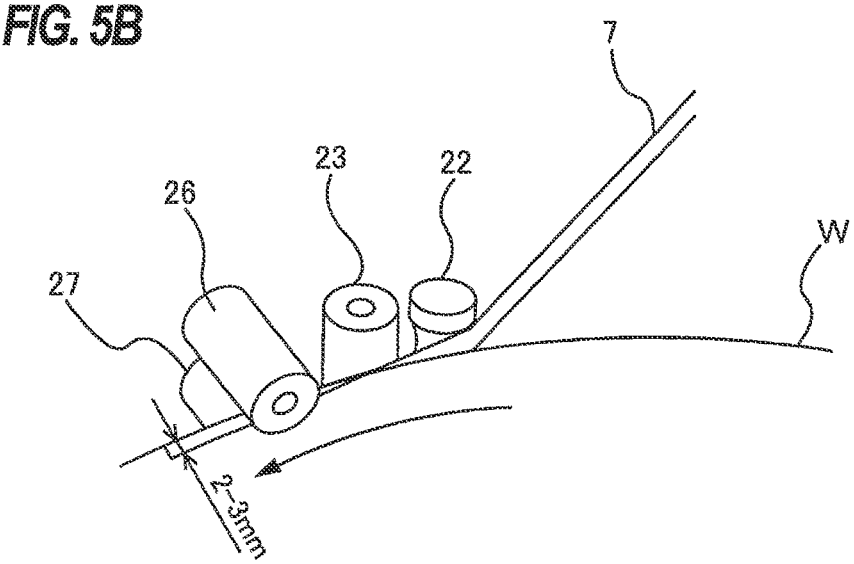

The side roller 23 is formed by an elastic material, such as urethane rubber. Therefore, when the side roller 23 presses the masking tape 7 with a predetermined force against the peripheral side surface of the wafer W, a circumferential surface of the side roller 23 is dented in conformity with the shape of the peripheral portion of the wafer W. Consequently, as shown in FIG. 5B, the entirety of the masking tape 7 is bent inwardly in the radial direction of the wafer W along the dented circumferential surface of the side roller 23.

Figure 5C:
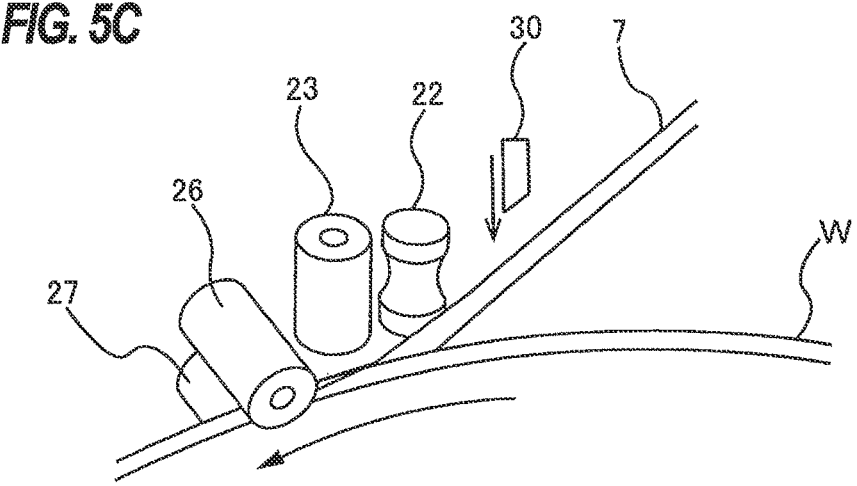
Figure 6:
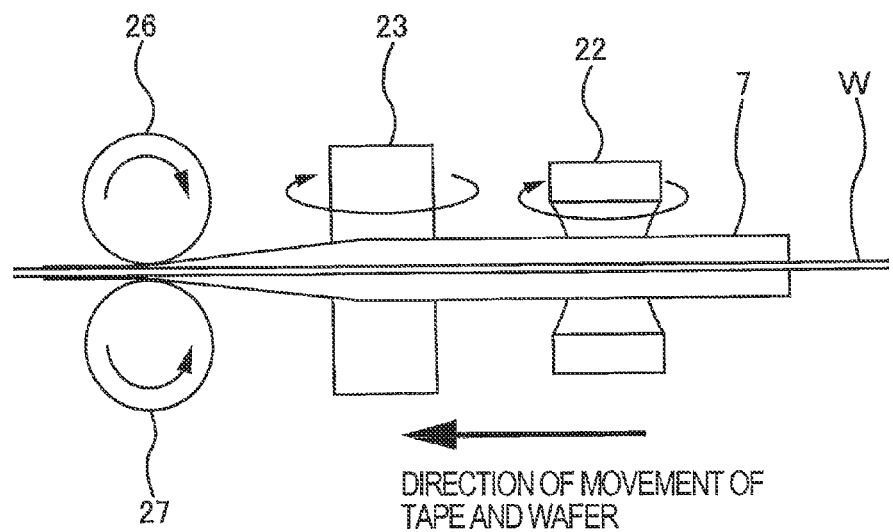
FIG. 6 is a side view illustrating a manner in which the masking tape is stuck on the peripheral portion of the wafer.

As the wafer W rotates, the masking tape 7 reaches the first roller 26 and the second roller 27. The masking tape 7, which has been bent by the side roller 23, is nipped with a predetermined force by the first roller 26 and the second roller 27. As shown in FIGS. 5B and 6, the upper haft of the masking tape 7 is bent by the first roller 26 along the longitudinal direction of the masking tape 7 and pressed against the upper surface of the peripheral portion of the wafer W. At the same time, the lower half of the masking tape 7 is bent by the second roller 27 along the longitudinal direction of the masking tape 7 and pressed against the lower surface of the peripheral portion of the wafer W. The masking tape 7 is stuck on the peripheral portion of the wafer W in this manner. Further, by making one rotation of the wafer W, the masking tape 7 is stuck on the entire peripheral portion of the wafer W as shown in FIG. 5C.

While the wafer is making one rotation so as to allow the masking tape 7 to be stuck on the entire peripheral portion of the wafer W, the first roller 26 and the second roller 27 keep pressing the masking tape 7 against the peripheral portion of the wafer W at a predetermined pressing force. This pressing force of the first roller 26 and the second roller 27 may be changed periodically while the wafer W is making one revolution. Specifically, the first roller 26 and the second roller 27 keep pressing the masking tape 7 against the peripheral portion of the rotating wafer W at varying pressing forces. The pressing force of the first roller 26 and the second roller 27 can be changed, for example, by changing the air pressure of the moving device 28 e.g., comprised of an air cylinder. By thus changing the pressing force of the first roller 26 and the second roller 27, the masking tape 7 stuck on the peripheral portion of the wafer W can be prevented from wrinkling.

As shown in FIG. 3, the tape sticking unit 8 may further include a third roller 34 and a fourth roller 35 which have the same construction as the first roller 26 and the second roller 27. The third roller 34 is disposed above the fourth roller 35, and the peripheral portion of the wafer W is located between the third roller 34 and the fourth roller 35. Since the fourth roller 35 is located below the third roller 34, only the third roller 34 is shown in FIG. 3.

The third roller 34 and the fourth roller 35 are configured to be rotatable on their axes. The axes of the third roller 34 and the fourth roller 35 extend parallel to the surface of the wafer V and extend in the radial direction of the wafer W. The third roller 34 and the fourth roller 35 are coupled to a moving device 36 e.g., comprised of an air cylinder. When the moving device 36 is in motion, the third roller 34 and the fourth roller 35 move in directions closer to and away from each other (i.e., in directions closer to and away from the peripheral portion of the wafer W). The directions of the movements of the third roller 34 and the fourth roller 35 are perpendicular to the surface of the wafer W.

With the above-described construction, the third roller 34 and the fourth roller 35 again press the masking tape 7, which has been stuck on the peripheral portion of the wafer W by the first roller 26 and the second roller 27, against the peripheral portion of the wafer W. Therefore, the masking tape 7 can be securely stuck on the peripheral portion of the wafer W by the third roller 34 and the fourth roller 35. The moving device 36 may be controlled such that the pressing force at which the third roller 34 and the fourth roller 35 press the masking tape 7 against the peripheral portion of the wafer W is larger than the pressing force at which the first roller 26 and the second roller 27 press the masking tape 7 against the peripheral portion of the wafer W. The pressing force at which the third roller 34 and the fourth roller 35 press the masking tape 7 against the peripheral portion of the wafer W can be adjusted, for example, by adjusting the air pressure of the moving device 36 e.g., comprised of an air cylinder.

A width of each of the bent portions of the masking tape 7 is 2 mm to 3 mm. The width of the bent portion of the masking tape 7, stuck on the upper surface of the peripheral portion of the wafer W (hereinafter referred to as upper-side tape width), may be equal to or different from the width of the bent portion of the masking tape 7 that is stuck on the lower surface of the peripheral portion of the wafer W (hereinafter referred to as lower-side tape width). In general, the wafer W, with devices formed thereon facing upward, is held on the substrate stage 2 of the substrate holder 1. In this case, the upper-side tape width may be larger than the lower-side tape width. A proportion of the upper-side tape width to the lower-side tape width can be adjusted by the vertical position of the positioning roller 22.

Figure 7:
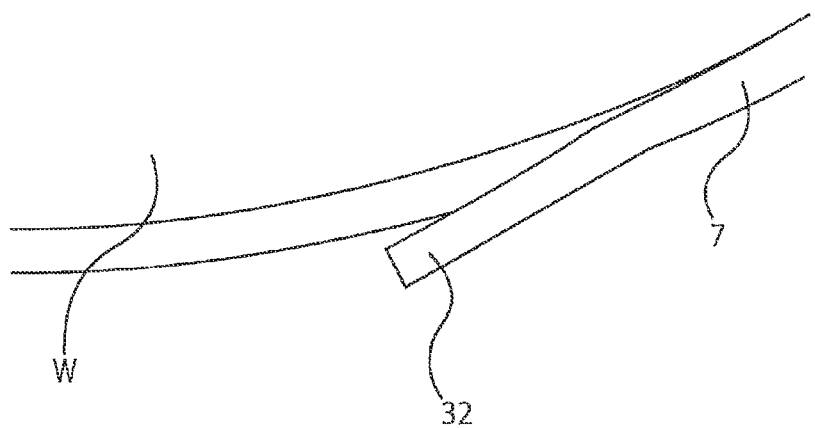
FIG. 7 is a diagram showing a projecting end portion of the masking tape which has been cut by a tape cutter.

After completion of the tape sticking process, the masking tape 7 is cut by a tape cutter 30 as shown in FIG. 5C. Before the masking tape 7 is cut, the positioning roller 22 and the side roller 23 are moved away from the wafer W to their retreat positions. The tape cutter 30 cuts the masking tape 7 at a position where the end of the masking tape 7 slightly projects from the peripheral portion of the wafer W. After the masking tape 7 is cut, the wafer W is rotated with the masking tape 7 interposed between the first roller 26 and the second roller 27, thereby forming a projecting end portion 32 which is the end portion of the masking tape 7 projecting from the peripheral portion of the wafer W, as shown in FIG. 7.

Before the masking tape 7 is cut by the tape cutter 30, the tape holding head 20 moves toward the masking tape 7, and the masking tape 7 is held by the tape holding head 20. Accordingly, a beginning of the masking tape 7 after cutting is held by the tape holding head 20.

The wafer W on which the masking tape 7 has been stuck in the above-described manner is taken from the substrate holder 1, and is subjected to wet processing such as plating and/or dry processing such as dry etching. After completion of processing of the wafer W, the wafer W is again transported to the tape sticking apparatus and held on the substrate stage 2 of the substrate holder 1.

As shown in FIG. 3, the tape sticking apparatus further includes a tape peeling unit 40 for peeling off the masking tape 7. The tape peeling unit 40 will now be described in detail with reference to FIG. 8. The tape peeling unit 40 includes a chucking mechanism 43 for holding the end of the masking tape 7 and drawing the masking tape 7 from the wafer W. The chucking mechanism 43 has a pair of chucking members (e.g., chucking claws) 41, 41 for holding the projecting end portion 32 of the masking tape 7. The chucking mechanism 43 is configured to be capable of moving toward and away from the wafer W.

The tape peeling unit 40 further includes a pair of tape advancing rollers 45, 45 for peeling the masking tape 7 from the wafer W while advancing the masking tape 7 at a speed which is synchronous with the rotational speed of the wafer W, and a take-up roller 46 for winding thereon the masking tape 7 advanced from the tape advancing rollers 45, 45. One of the tape advancing rollers 45, 45 is coupled to a motor 47, and the take-up roller 46 is coupled to a motor 49. The rollers 45, 46 are rotated at predetermined speeds by these motors 47, 49.

Figure 8:
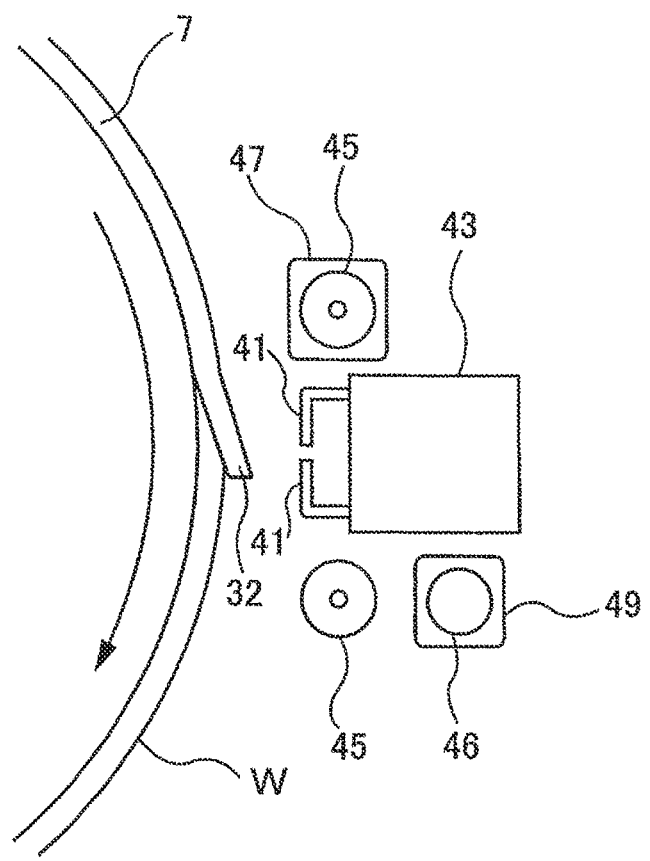
FIG. 8 is a plan view schematically showing a tape peeling unit which peels the masking tape from the wafer.
Figure 9A:
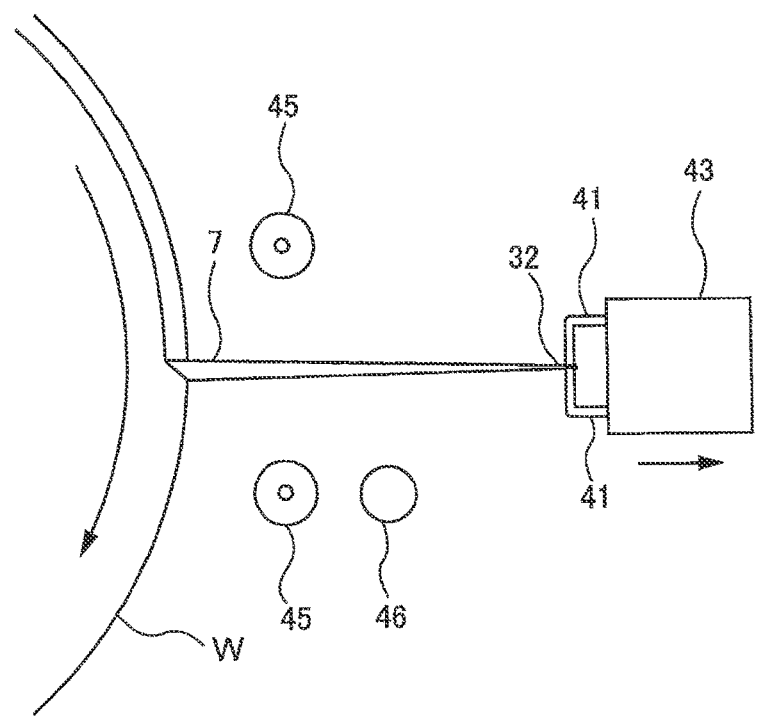
FIG. 9A and FIG. 9B are diagrams each showing a manner in which the masking tape is peeled from the wafer.

The tape peeling unit 40 operates as follows. First, as shown in FIG. 8, the wafer W is rotated by the substrate holder 1 until the projecting end portion 32 comes to a position in front of the chucking mechanism 43. The chucking mechanism 43 moves toward the wafer W and holds the projecting end portion 32 with its chucking members 41, 41. Subsequently, as shown in FIG. 9A, the wafer W is rotated while the chucking mechanism 43, holding the projecting end portion 32 with the chucking members 41, 41, is moved backward. During this operation, the backward movement speed of the chucking mechanism 43 is synchronized with the rotational speed of the wafer W such that an angle between the masking tape 7 peeled from the wafer W and a tangential direction of the wafer W is 90°.

Figure 9B:
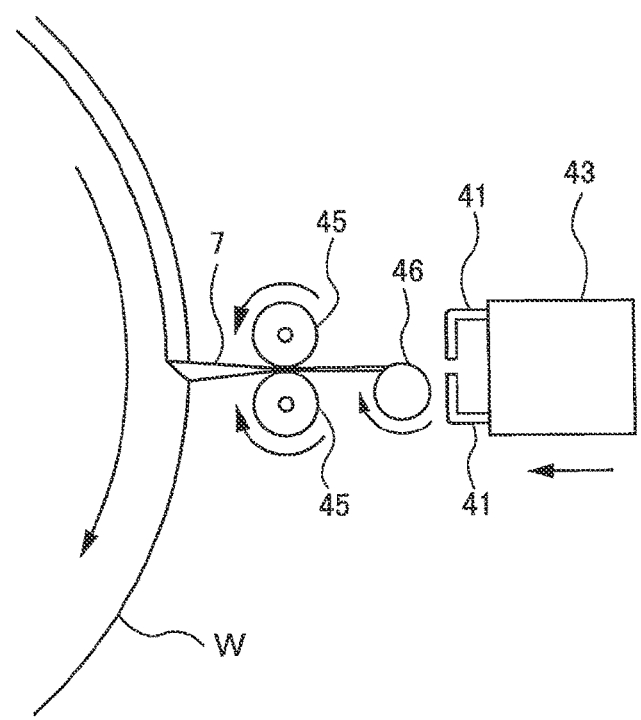

After the backward movement of the chucking mechanism 43 is terminated, the tape advancing rollers 45, 45 approach each other to nip the peeled masking tape 7 between them as shown in FIG. 9B. The take-up roller 46 is moved until it comes into contact with the peeled portion of the masking tape 7. The tape advancing rollers 45, 45 are then rotated to advance the peeled masking tape 7 to the take-up roller 46 at a predetermined speed. At the same time, the take-up roller 46 in contact with the masking tape 7 is rotated, whereby the peeled masking tape 7 is wound around the take-up roller 46.

Simultaneously with the start of winding the masking tape 7, the chucking mechanism 43 starts to move toward the take-up roller 46. When the masking tape 7 is wound around the take-up roller 46 to some extent, the chucking members 41, 41 release the projecting end portion 32, whereby the take-up roller 46 is allowed to continue winding of the masking tape 7 around itself. The tape advancing rollers 45, 45 rotate at a rotational speed which is synchronized with the rotational speed of the wafer W such that the angle between the masking tape 7 peeled from the wafer W and the tangential direction of the wafer W is 90°.

The take-up roller 46 and the tape advancing rollers 45, 45 continue rotating until the entirety of the masking tape 7 is peeled from the peripheral portion of the wafer W and is wound around the take-up roller 46. Though not shown in FIG. 9B, the tape advancing rollers 45, 45 and the take-up roller 46 are rotated by the motors 47, 49, respectively. After the winding of the masking tape 7 is terminated, the take-up roller 46 moves backward and the tape advancing rollers 45, 45 move in the directions away from each other.

Figure 10:
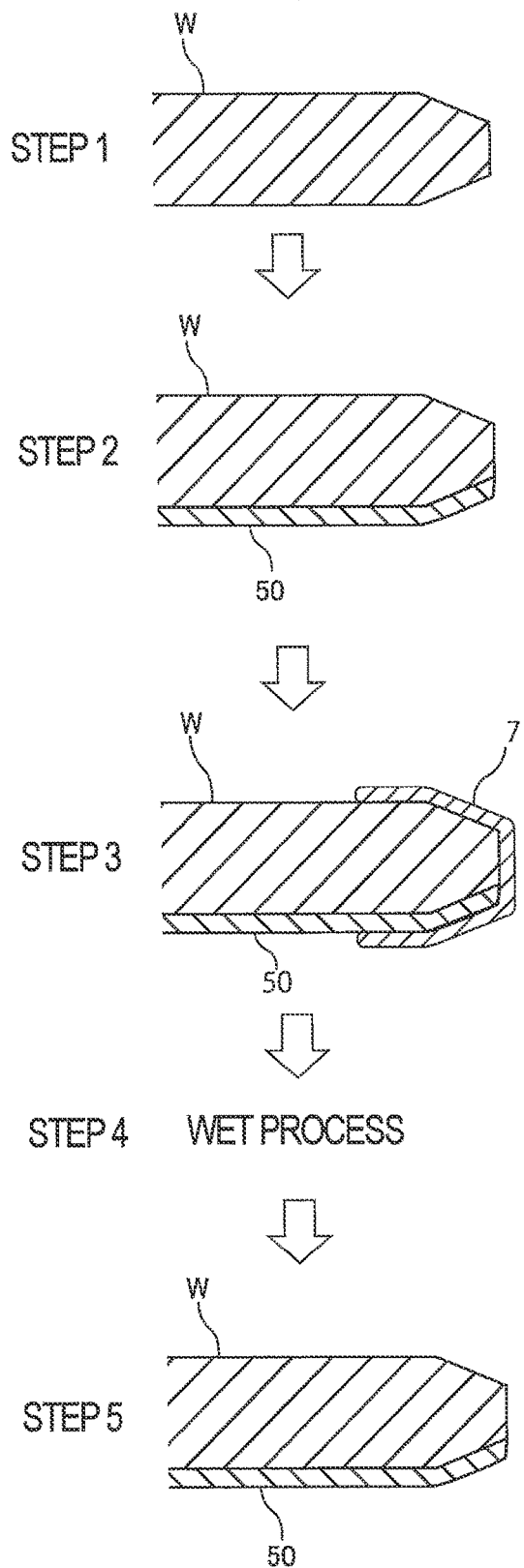
FIG. 10 is a diagram showing an exemplary flow of processing a wafer using the masking tape.

A sequence of processing a wafer W using the masking tape 7 will now be described with reference to FIG. 10. FIG. 10 is a diagram showing an exemplary process flow of processing the wafer W using the masking tape 7. First, the wafer W having devices formed on the front surface is prepared (step 1). A protective film 50 is attached to the entire back surface of the wafer W (step 2). The wafer W with the protective film 50 attached is transported to the tape sticking apparatus. The wafer W, with the devices formed thereon facing upward, is held on the substrate stage 2 of the substrate holder 1. The masking tape 7 is stuck on the entirety of the peripheral portion of the wafer W by the tape sticking unit 8 in the above-described manner (step 3). The masking tape 7 covers a peripheral portion of the protective film 50 and the entire peripheral portion of the wafer W to protect the peripheral portion of the wafer W.

Next, the wafer W with the masking tape 7 attached is subjected to a wet process (step 4). The wet process is, for example, a plating process in which the wafer W, whose peripheral portion is protected by the masking tape 7, is immersed in a plating solution. With the masking tape 7 covering the peripheral portion of the wafer W and the peripheral portion of the protective film 50, the peripheral portion of the protective film 50 can be prevented from peeling off the wafer W. Therefore, the plating solution does not come into contact with the back surface of the wafer W.

After completion of the wet process, the wafer W is again transported to the tape sticking apparatus. In the tape sticking apparatus, the masking tape 7 is peeled off by the tape peeling unit 40 (step 5). In this manner, the sequence of wafer processing is completed.

A wet etching process is another example of the wet process. In the case of a wet etching process, an etching liquid can be prevented from contacting the back surface of the wafer W. Though different from the illustrated case, the wafer W with the masking tape 7 attached may be subjected to a dry etching process. While a dry etching process does not use the protective film 50 for protecting the back surface of the wafer W, the masking tape 7 is used to protect the peripheral portion of the wafer W. Therefore, the formation of black silicon on the peripheral portion of the wafer W can be prevented.

Although the embodiments have been described above, it should be understood that the present invention is not limited to the above embodiments, and various changes and modifications may be made without departing from the technical concept of the appended claims, the specification, and the drawings.

What is claimed is:

1. A tape sticking method comprising:
sticking a masking tape onto a peripheral portion of a substrate while rotating the substrate by
pressing the masking tape against a peripheral side surface of the substrate while rotating the substrate;
bending the masking tape, which has been pressed against the peripheral side surface of the substrate, along a longitudinal direction of the masking tape by a first roller and sticking a bent portion of the masking tape onto an upper surface of the peripheral portion of the substrate by the first roller while rotating the substrate and while forcing the first roller against the bent portion of the masking tape at a pressing force controlled by a moving device coupled to the first roller; and
bending the masking tape, which has been pressed against the peripheral side surface of the substrate, along the longitudinal direction of the masking tape by a second roller and sticking a bent portion of the masking tape onto a lower surface of the peripheral portion of the substrate by the second roller while rotating the substrate and while forcing the second roller against the bent portion of the masking tape at a pressing force controlled by the moving device coupled to the second roller.

2. The tape sticking method according to claim 1, further comprising:
holding a beginning of the masking tape and sticking the beginning onto the peripheral side surface of the substrate before rotating the substrate.

3. The tape sticking method according to claim 1, further comprising:
before pressing the masking tape against the peripheral side surface of the substrate, performing positioning of the masking tape in a direction perpendicular to a surface of the substrate.

4. The tape sticking method according to claim 1, further comprising:
cutting the masking tape with its end projecting from the peripheral portion of the substrate.

5. The tape sticking method according to claim 1, wherein a width of the bent portion of the masking tape stuck on the upper surface of the peripheral portion of the substrate is different from a width of the bent portion of the masking tape stuck on the lower surface of the peripheral portion of the substrate.

6. The tape sticking method according to claim 1, wherein a width of the bent portion of the masking tape stuck on the upper surface of the peripheral portion of the substrate is larger than a width of the bent portion of the masking tape stuck on the lower surface of the peripheral portion of the substrate.

7. The tape sticking method according to claim 1, further comprising:
peeling the masking tape from the peripheral portion of the substrate while rotating the substrate.

8. The tape sticking method according to claim 7, wherein peeling the masking tape from the peripheral portion of the substrate comprises:
peeling the masking tape from the substrate while advancing the masking tape at a speed which is synchronous with a rotational speed of the substrate; and
winding the masking tape which has been advanced at the speed which is synchronous with the rotational speed of the substrate.

9. The tape sticking method according to claim 1, further comprising:
during sticking the bent portions of the masking tape by the first roller and the second roller, changing the pressing force of the first roller and the pressing force of the second roller while the substrate is making one revolution.

10. A tape sticking apparatus comprising:
a substrate holder configured to hold and rotate a substrate; and
a tape sticking unit configured to stick a masking tape onto a peripheral portion of the substrate held on the substrate holder, wherein the tape sticking unit includes:
a side roller configured to press the masking tape against a peripheral side surface of the substrate;
a first roller configured to bend the masking tape, which has been pressed against the peripheral side surface of the substrate, along a longitudinal direction of the masking tape and stick a bent portion of the masking tape onto an upper surface of the peripheral portion of the substrate;
a second roller configured to bend the masking tape, which has been pressed against the peripheral side surface of the substrate, along the longitudinal direction of the masking tape and stick a bent portion of the masking tape onto a lower surface of the peripheral portion of the substrate; and
a moving device coupled to the first roller and the second roller and configured to move the first roller and the second roller in directions closer to and away from each other.

11. The tape sticking apparatus according to claim 10, wherein the tape sticking unit further includes a tape holding head configured to hold a beginning of the masking tape and stick the beginning onto the peripheral side surface of the substrate.

12. The tape sticking apparatus according to claim 10, wherein the tape sticking unit further includes a positioning member configured to perform positioning of the masking tape in a direction perpendicular to a surface of the substrate.

13. The tape sticking apparatus according to claim 10, wherein the tape sticking unit further includes a tape cutter configured to cut the masking tape with its end projecting from the peripheral portion of the substrate.

14. The tape sticking apparatus according to claim 10, further comprising:
a tape peeling unit configured to peel the masking tape from the peripheral portion of the substrate.

15. The tape sticking apparatus according to claim 14, wherein the tape peeling unit includes:
a tape advancing roller configured to peel the masking tape from the substrate while advancing the masking tape at a speed which is synchronous with a rotational speed of the substrate; and
a take-up roller configured to wind thereon the masking tape advanced from the tape advancing roller.

16. The tape sticking apparatus according to claim 10, wherein the moving device comprises an air cylinder.

\* \* \* \* \*